Feb. 22, 1938.   H. H. GUNTER   2,108,888
AUTOMOBILE LIFT
Filed May 20, 1937
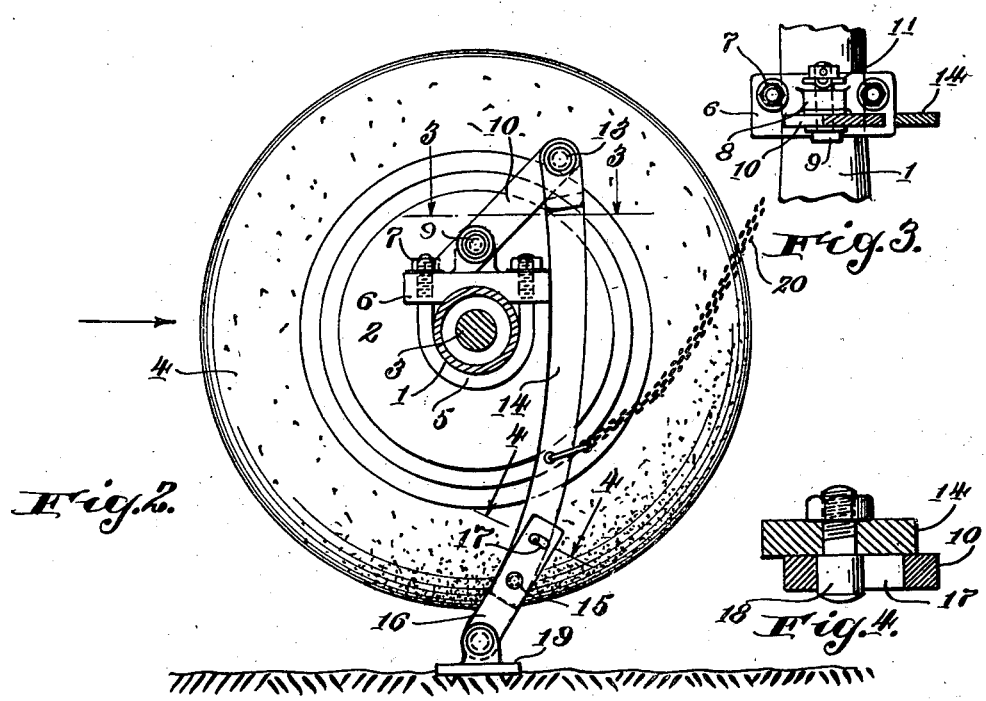
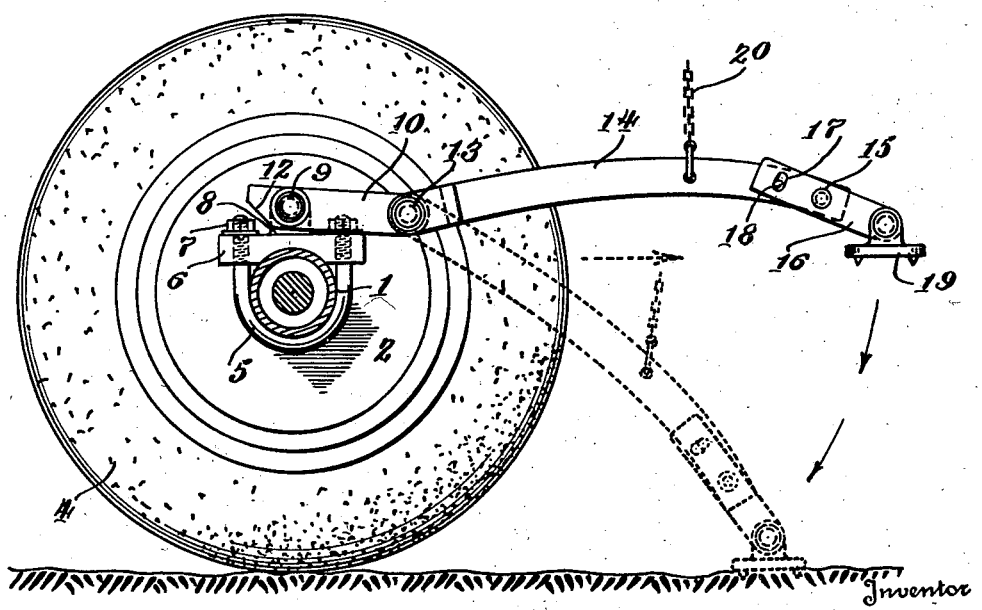

Patented Feb. 22, 1938

2,108,888

UNITED STATES PATENT OFFICE 2,108,888

AUTOMOBILE LIFT

Howard H. Gunter, Baltimore, Md.

Application May 20, 1937, Serial No. 143,688

5 Claims. (Cl. 254—86)

This invention relates to a lifting device for use on motor and other vehicles and it consists of a lifting member having one end attached to some portion of the vehicle running gear, such as the axle, and the free end of the lifting member is intended to be placed on the ground and the vehicle moved longitudinally and this movement rides the vehicle up on the member. Prior to this invention it has been difficult to keep the member from sliding along the ground when the vehicle is moved in being elevated, and this invention is directed to a member having various joints which cause its ground engaging end to firmly engage the surface so that the vehicle will be raised by its longitudinal movement even though the surface of the ground may be quite smooth such as concrete or macadam.

The member may be maintained in inactive position elevated from ground contact when not in use. When in this inactive position the member does not in any way interfere with the normal action of the vehicle and the movement of its body in respect to its chassis.

The accompanying drawing forming a part hereof illustrates one embodiment of the invention.

In Figure 1 the lifting device is shown as attached to a vehicle and is in inoperative position, as shown in solid lines.

In Figure 2 the lifting member is in operative position with the wheel of the vehicle raised from the ground.

Figure 3 is a sectional view on line 3—3 of Fig. 2.

Figure 4 is a sectional view on line 4—4 of Fig. 2.

In the drawing similar numerals refer to similar parts throughout the several views.

The lift as shown is attached to the axle casing 1 of a vehicle having a wheel 2 driven by the axle 3. Wheel 2 has thereon a rubber tire 4. A U bolt 5 surrounds the axle casing and projects through holes in plate 6 to which it is held by nuts 7. Plate 6 has integral therewith projecting lug 8 drilled to secure a bolt 9 passing therethrough and through the lower end of link 10. Bolt 9 preferably has a spring washer 11 at one end to prevent rattle between the bolt, link 10 and the lug 8 when the vehicle is in motion. Link 10 at its lower end has a bearing surface 12 to limit the upward angular swing of the link when the lifting member is placed in operation. The free or upper end of the link 10 has bolted thereto by bolt 13 the upper end of the lifting member 14.

Lifting member 14 has bolted to its lower end, by bolt 15, lower section 16. This section has in it, and above the bolt 15, a slot 17 which rides freely on pin member 18 made fast in lifting member 14. A foot member 19 is bolted to the lower end of the lower section 16 to form a ground engaging end for the lifting member.

When the lifting member is out of use it may be raised to a substantially horizontal position by a chain or like member 20 the upper end of which may be secured to any portion of the vehicle body. This position of the lifting member 14 is shown in solid lines in Figure 1. In this position the link 10 extends longitudinally of the body of the vehicle and under no circumstances would it strike the body of the vehicle when the springs between the axle and body are compressed.

When it is desired to raise the vehicle on the lifting member the chain 20 is released and the first position taken by the lifting member is shown by dotted lines in Fig. 1. With the lifting member in this position the vehicle is given a sudden but short movement in the direction of the arrow shown in Fig. 1. The effect of this movement is to bend the joint of the lifting member 14 with its lower section 16 to the extent allowed by the slot 17. The sudden movement of the vehicle with the quick give allowed by this joint causes the ground engaging member to dig in and take hold so that no sliding takes place between the ground engaging member and the pavement. With further movement of the vehicle in the same direction the link 10 rises at its free end so that force having a substantial vertical component is suddenly exerted upon the lifting member causing the ground engaging member to further dig in and not slip. This action continues until the bearing surface 12 on the link 10 engages the plate 6 and the force then tends to lift the body of the vehicle off the wheel 2 and tire 4. As the vehicle goes further in this same direction member 14 strikes against the end of plate 6 which forms a stop to limit the movement of the lifting member and in this position, shown in Fig. 2, the vertical thrust on the lifting member has passed to the other side of the ground engaging member from that on which it was at the beginning of the operation. This passage of the vertical position of thrust maintains the vehicle in its raised position so that there is no tendency, even on an incline, for the vehicle to move from under the lifting member. With the vehicle raised in this manner the tire may be changed or any other operation performed that may be required.

The vehicle may be removed from the lifting member by reversing the movement of the vehicle a very small amount which may be done by reversing the direction of the drive of the power and even though the lifting member as shown is on a driving wheel of the vehicle the amount of movement required will take place before the differential of the drive causes the raised wheel of the vehicle to spin or if in any case this did not prove successful a person could easily push the vehicle from the lifting member by hand.

Any wheel of a vehicle equipped with four of these lifting members can be very quickly raised from the ground and the necessary repair made without getting under the vehicle to place a jack in the proper position which becomes more and more difficult as vehicles are covered up with stream lining effects as is done at the present time.

Various modifications may be made in the invention without departing from the spirit thereof and what is claimed as new and is desired to be secured by Letters Patent is:

1. Means to elevate a wheel of a vehicle in response to movement of the vehicle comprising support and stop members on a part of the vehicle running gear, a lifting member having a ground engaging end, a link connecting the other end of the lifting member with said support for vertical swinging movement from a position extending lengthwise with said link substantially horizontally in the path of vehicle travel, to a bowed position with said link, substantially vertical, lifting the vehicle wheel, passing the vertical position of thrust on the lifting member and engaging the stop member.

2. Means to elevate a wheel of a vehicle in response to movement of the vehicle comprising support and stop members on a part of the vehicle running gear, a lifting member having a ground engaging end, a link connecting the other end of the lifting member with said support for vertical swinging movement from a position extending lengthwise with said link substantially horizontally in the path of vehicle travel, to a bowed position with said link, substantially vertical, lifting the vehicle wheel, passing the vertical position of thrust on the lifting member and engaging the stop member and means to limit the upward swing of said link with respect to said support.

3. Means to elevate a wheel of a vehicle in response to movement of the vehicle comprising a lifting member, support and stop members for said lifting member on a part of the vehicle running gear, said lifting member being connected to said support for vertical swinging movement from a position substantially horizontal and in the path of vehicle travel to a substantially vertical position, lifting the vehicle wheel, passing the vertical position of thrust, and engaging the stop member, said lifting member having a ground engaging end, and a pivoted joint adjacent said end, and a stop to limit the movement at said joint whereby the lifting member bows downwardly when the lifting member engages the ground, and upwardly when the vehicle is driven against the lifting member to raise the vehicle.

4. Means to elevate a wheel of a vehicle in response to movement of the vehicle comprising support and stop members on a part of the vehicle running gear, a lifting member having a ground engaging end, a link connecting the other end of the lifting member with said support for vertical swinging movement from a position extending lengthwise with said link substantially horizontally in the path of vehicle travel, to a bowed position with said link, substantially vertical, lifting the vehicle wheel, passing the vertical position of thrust on the lifting member and engaging the stop member, said lifting member having a pivoted joint adjacent the ground engaging end and a stop to limit the movement at said joint whereby the lifting member bows downwardly when the lifting member engages the ground, and upwardly when the vehicle is driven against the lifting member to raise the vehicle.

5. Means to elevate a wheel of a vehicle in response to movement of the vehicle comprising support and stop members on a part of the vehicle running gear, a lifting member having a ground engaging end, a link connecting the other end of the lifting member with said support for vertical swinging movement from a position extending lengthwise with said link substantially horizontally in the path of vehicle travel, to a bowed position with said link, substantially vertical, lifting the vehicle wheel, passing the vertical position of thrust on the lifting member and engaging the stop member and means to limit the upward swing of said link with respect to said support, said lifting member having a pivoted joint adjacent the ground engaging end, and a stop to limit the movement at said joint whereby the lifting member bows downwardly when the lifting member engages the ground, and upwardly when the vehicle is driven against the lifting member to raise the vehicle.

HOWARD H. GUNTER.